Figure 1:
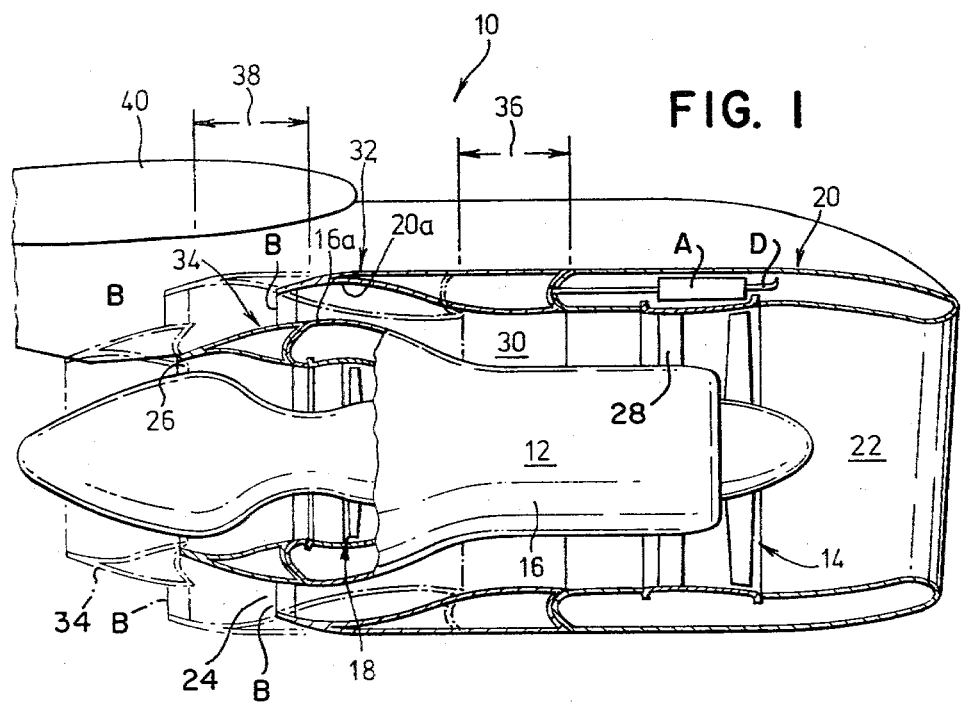

United States Patent [19]

Mullins

[11] 4,228,651

[45] Oct. 21, 1980

[54] DUCTED FAN GAS TURBINE ENGINE

[75] Inventor: John A. Mullins, Chellaston, England

[73] Assignee: Rolls-Royce Limited, London, England

[21] Appl. No.: 954,082

[22] Filed: Oct. 24, 1978

[30] Foreign Application Priority Data

Nov. 29, 1977 [GB] United Kingdom ............... 49535/77

[51] Int. Cl.³ .............................................. F02K 3/02
[52] U.S. Cl. ................................................. 60/226 A
[58] Field of Search ..................................... 60/226 A

[56] References Cited

U.S. PATENT DOCUMENTS

| 3,492,821 | 2/1970 | Monaghan | 60/226 A |
| 4,073,440 | 2/1978 | Hapke | 60/226 A |

Primary Examiner—Douglas Hart
Attorney, Agent, or Firm—Cushman, Darby & Cushman

[57] ABSTRACT

The downstream portions of a ducted fan, gas turbine engine are translatable to open respective gaps and allow the lateral egress of exhaust gas and fan air. The fan air outlet is upstream of the exhaust gas outlet and the translatable fan cowl portion and gas turbine engine casing cooperate to reduce the fan annulus on translation. Exhaust gas passing laterally through its outlet enters any annular space remaining between casing and cowl and prevents the passage of fan air in a downstream direction.

3 Claims, 1 Drawing Figure

DUCTED FAN GAS TURBINE ENGINE

This invention concerns ducted fan gas turbine engines. More particularly it refers to ducted fan gas turbine engines in which gas and fan flows are maintained as individual flows.

Ducted fan gas turbine engines comprise a core gas generator having a hot gas exhaust nozzle, the core gas generator being surrounded by a cowl which, together with the core gas generator, forms a flow duct. A fan is mounted at the upstream end of the core gas generator and is rotated thereby. Most of the resulting airflow passes through the flow duct externally of the core gas generator and exits from a further exhaust nozzle. The remainder passes through the core gas generator. The further exhaust nozzle lies in a plane upstream of the hot gas nozzle and is annular.

It is common practice to include thrust spoiling equipment in the fan cowl and/or the casing of the core gas generator. Such equipment normally includes movable cowl or casing portions which, when moved, open gaps in the cowl or casing through which fan air or hot gas, flows to atmosphere in a direction radially of the engine.

In such arrangements as described hereinbefore, it is the accepted practice to position the respective nozzle structures, such that the gap in the core gas generator casing opens at a position downstream of the fan nozzle plane and to provide blocker flaps in the fan cowl, with which to block off the fan flow duct, at a position downstream of the fan air exit gap. Such an arrangement, though quite efficient as regards performing the task for which it is designed, introduces penalties which the present invention sets out to obviate or at least reduce in effect.

One penalty is the weight of the blocker doors and their necessarily complex construction and operating linkages.

A further penalty is the difficulty experienced in providing efficient mechanical sealing of the blocker doors, one against the other or adjacent pairs.

A further penalty is incurred by radial deflection of the hot gases from the core gas generator. Hot gases flowing radially outwardly of the engine have to be prevented from impinging on whatever structure the engine is mounted on e.g. an aircraft wing or fuselage. This calls for structure other than normal aircraft or engine structure, to provide a shield against the heat and forces of the hot gas. Again a weight penalty is involved and possibly drag, where the supporting structure is an aircraft.

It is an object of this invention to provide a ducted fan gas turbine engine in which the sealing problems mentioned hereinbefore are obviated, weight is reduced and external deflection structure, over and above normal aircraft or engine structure, is eliminated.

According to the present invention there is provided a ducted fan gas turbine engine, comprising a core gas generator enclosed in a streamlined casing, a fan at the upstream end thereof, a cowl surrounding the core gas generator and fan in spaced relationship, so as to form an annular fan duct therewith, the fan duct exit nozzle plane being further upstream than the core gas generator exit nozzle plane, the downstream end portions of both the cowl and the casing being adapted for simultaneous translation to open respective gaps therein, the gap so formed in the casing being within the translatable portion of the cowl, the inner wall of the translatable portion of the cowl and the downstream portion of the fixed casing portion being shaped so that on translation of said cowl and casing portions in a downstream direction, during operation of said engine, said inner wall of the cowl portion and fixed casing portion cooperate to substantially reduce the fan duct annulus downstream of the gap in the cowl and, hot gases passing from the core gas generator via the gap in the casing complete the closure thereof, to prevent fan air from passing therethrough and means for effecting said translation.

Figure 2:
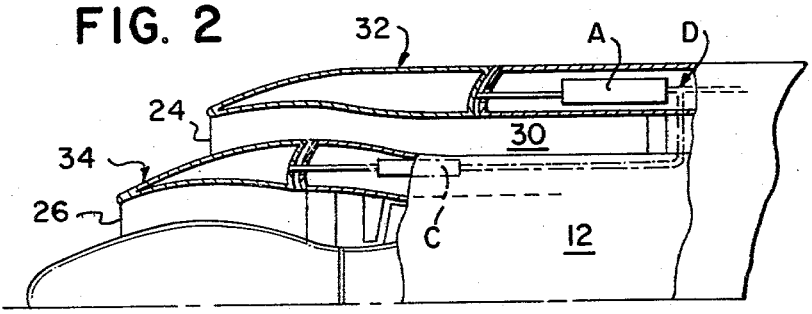

The invention will now be described by way of example and with reference to the accompanying drawings in which:

FIG. 1 is a diagrammatic part cross-sectional view of a ducted fan gas turbine engine of the present invention, and FIG. 2 is a fragmentary diagrammatic part cross-sectional view similar to FIG. 1 but illustrating a modified means of translating the downstream end portions of the cowl and the casing.

In the drawing, a ducted fan gas turbine engine is designated 10; it comprises a core gas generator 12 which supports a fan 14 in known manner, at its upstream end. The term "upstream" is used throughout this specification in the context of the normal direction of flow of gases and air through the engine.

A streamlined casing 16 encloses the rotating parts of the core gas generator of which only a turbine portion 18 is shown.

A cowl 20 envelops a substantial portion of the core gas generator and projects beyond its upstream end, to surround fan 14 and provide an air intake 22 for both fan and core gas generator.

Cowl 20 is spaced from the core gas generator by struts 28, so as to form therewith, an annular fan air flow duct 30. The fan cowl exit nozzle 24 lies in a plane upstream of the plane of the core gas generator exit nozzle 26.

The inner, downstream wall portion 20a of cowl 20, is concavely curved and the downstream portion 16a of streamlined casing 16 is convexly curved in a manner which is complementary thereto. The magnitude of the maximum diameter of the casing portion 16a substantially corresponds to the diameter of the cowl inner wall just upstream of curved portion 20a.

Both cowl 20 and casing 16 have downstream end portions 32,34 respectively, which are translatable in a downstream direction to positions indicated in dotted lines to open gaps 36,38 through which fan air and exhaust gases can escape from their respective flow ducts.

The downstream cowl and casing portions are connected by means not shown in FIGS. 1 and 2, for simultaneous translatory movement. The means as shown in FIG. 1 comprises rigid struts B joining the two portions 32 and 34 and common drive means, such as the ram A suitably operated by a source of air supply D. Alternatively, as shown in FIG. 2, separate drive means synchronised to give the desired effect may be utilized. In this instance, the separate drive means may be the rams A and C, respectively, operatively connected to the cowl portion 32 and casing portion 34, the rams A and C being operatively connected to the common air supply D.

When the cowl and casing portions 32,34 translate in a downstream direction, portion 32 comes to rest with its inner wall adjacent casing portion 16a. Only a small gap remains between the two. The need for blocker flaps is thus obviated. Fan air then escapes directly to atmosphere via resulting gap 36. However, gap 38 which is formed in casing 16, is overlapped by cowl portion 32, thus hot gas which passes through gap 38, is contained by cowl portion 32 and directed thereby out of fan nozzle 24, in a downstream direction. However, the gas, on passing into the fan nozzle area through gap 38, also expands in an upstream direction and acts as a fluid seal in the small space between the inner wall of cowl portion 32 and the fixed casing portion 16a. The passing of substantially all of the fan air through gap 36 is thus assured.

Further advantages accrue from exiting the gas into the fan nozzle area. These are that the fan exit nozzle provides a larger exit area than that which is required for the core gas generator flow, to give forward thrust. Consequently forward thrust is spoiled and one objective is achieved i.e. the spoiling of thrust without use of target deflector doors. Further, the fan cowl structure 32 turns the gas in a downstream direction, before the gas exits from fan nozzle 24, thus preventing impingement of hot gases on fixed structure such as an aircraft wing 40 on which, in the present example, the engine 10 is mounted. Shielding is therefore achieved, without incorporation of special shielding devices, over and above normal engine structure.

I claim:

1. A ducted fan gas turbine engine, comprising a core gas generator enclosed in a streamlined casing, a fan at the upstream end thereof, a cowl surrounding the core gas generator and fan in spaced relationship, so as to form an annular fan duct therewith, the fan duct exit nozzle plane being further upstream than the core gas generator exit nozzle plane, the downstream end portions of both the cowl and the casing being adapted for simultaneous translation to open respective gaps therein, the gap so formed in the casing being within the translatable portion of the cowl, the inner wall of the translatable portion of the cowl and the fixed casing portion being shaped so that on translation of said cowl and casing portions in a downstream direction during operation of said engine, said inner wall of the cowl portion and fixed casing portion cooperate to substantially reduce the fan duct annulus downstream of the gap in the cowl and, hot gases passing from the core gas generator via the gap in the casing complete the closure thereof, to prevent fan air from passing therethrough and means for effecting said translation.

2. A ducted fan gas turbine engine as claimed in claim 1 wherein the translatable downstream end portions of both the cowl and casing are interconnected for simultaneous translation to open respective gaps, by rigid struts bridging the annulus between them.

3. A ducted fan gas turbine engine as claimed in claim 1 wherein the translatable downstream end portions of both the cowl and casing are interconnected for simultaneous translation to open respective gaps, via separate translation effecting means which are synchronised to bring about simultaneous movement thereof.

* * * * *